US008286157B2

(12) United States Patent
Drissi et al.

(10) Patent No.: US 8,286,157 B2
(45) Date of Patent: Oct. 9, 2012

(54) METHOD, SYSTEM AND PROGRAM PRODUCT FOR MANAGING APPLICATIONS IN A SHARED COMPUTER INFRASTRUCTURE

(75) Inventors: Youssef Drissi, Ossining, NY (US); Moon J. Kim, Wappingers Falls, NY (US); Lev Kozakov, Stamford, CT (US); Dikran S. Meliksetian, Danbury, CT (US); Blanche M. Waddell, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1032 days.

(21) Appl. No.: 11/068,368

(22) Filed: Feb. 28, 2005

(65) Prior Publication Data

US 2006/0195688 A1 Aug. 31, 2006

(51) Int. Cl.
*G06F 9/445* (2006.01)
(52) U.S. Cl. ........ 717/174; 707/736; 707/755; 707/705; 709/226; 709/225; 709/248; 709/238; 726/2; 726/10; 713/152; 718/104
(58) Field of Classification Search .................... 713/152
See application file for complete search history.

(56) References Cited

U.S. PATENT DOCUMENTS

| | | | |
|---|---|---|---|
| 5,548,724 A | 8/1996 | Akizawa et al. | |
| 5,659,786 A | 8/1997 | George et al. | |
| 5,784,702 A | 7/1998 | Greenstein et al. | |
| 5,790,886 A | 8/1998 | Allen | |
| 5,812,780 A | 9/1998 | Chen et al. | |
| 6,011,918 A | 1/2000 | Cohen et al. | |
| 6,058,416 A | 5/2000 | Mukherjee et al. | |
| 6,247,109 B1 | 6/2001 | Kleinsorge et al. | |
| 6,275,863 B1 | 8/2001 | Leff et al. | |
| 6,341,314 B1 | 1/2002 | Doganata et al. | |

(Continued)

FOREIGN PATENT DOCUMENTS

JP 2002312315 10/2002

(Continued)

OTHER PUBLICATIONS

Bela Bollabas et al., "Coupling Scale-Free and Classical Random Graphs", Internet Mathematics vol. 1, No. 2, dated 2003, pp. 215-225.

(Continued)

*Primary Examiner* — Nathan Flynn
*Assistant Examiner* — Bryan Wright
(74) *Attorney, Agent, or Firm* — Hoffman Warnick LLC; William E. Schiesser (57) ABSTRACT

Under the present invention, when an application is deployed, certain information corresponding thereto will be stored in an Enterprise Application Directory (EAD). Thereafter, when an instance of the application is requested (e.g., by a requestor), the information is retrieved from the EAD. In addition, the instance is registered with an Application Access Registry (AAR). Registering the instance involves creating a record in the AAR, generating a unique application access key for the instance, and storing the access key with the information in the record. The access key (and optionally the information) is then returned to the requestor, which can then issue service requests to one or more grid services in the shared computer infrastructure. The service request will include the access key so that the grid service can identify the application by searching for the record in the registry using the access key.

21 Claims, 4 Drawing Sheets

U.S. PATENT DOCUMENTS

| | | | |
|---|---|---|---|
| 6,487,493 | B2 | 11/2002 | Uekawa et al. |
| 6,532,488 | B1 * | 3/2003 | Ciarlante et al. ............ 709/205 |
| 6,587,938 | B1 | 7/2003 | Eilert et al. |
| 6,597,366 | B1 | 7/2003 | Bennett et al. |
| 6,597,956 | B1 | 7/2003 | Aziz et al. |
| 6,813,637 | B2 | 11/2004 | Cable |
| 6,917,963 | B1 * | 7/2005 | Hipp et al. .................... 709/204 |
| 6,983,463 | B1 | 1/2006 | Hunt |
| 6,990,662 | B2 | 1/2006 | Messer et al. |
| 7,089,299 | B2 | 8/2006 | Chetuparambil et al. |
| 7,143,413 | B2 | 11/2006 | McCarthy et al. |
| 7,162,628 | B2 | 1/2007 | Gentil et al. |
| 7,171,470 | B2 * | 1/2007 | Doyle et al. ................... 709/225 |
| 7,810,090 | B2 | 10/2010 | Gebhart |
| 7,970,902 | B2 | 6/2011 | Rolia et al. |
| 2001/0002455 | A1 | 5/2001 | Uekawa et al. |
| 2001/0029519 | A1 | 10/2001 | Hallinan et al. |
| 2002/0087621 | A1 | 7/2002 | Hendriks |
| 2002/0129085 | A1 | 9/2002 | Kubala et al. |
| 2003/0005109 | A1 | 1/2003 | Kambhammettu et al. |
| 2003/0014604 | A1 | 1/2003 | Nishio et al. |
| 2003/0046270 | A1 | 3/2003 | Leung et al. |
| 2003/0046357 | A1 | 3/2003 | Doyle et al. |
| 2003/0061399 | A1 | 3/2003 | Wagener et al. |
| 2003/0120701 | A1 | 6/2003 | Pulsipher et al. |
| 2003/0126265 | A1 | 7/2003 | Aziz et al. |
| 2003/0131136 | A1 | 7/2003 | Emerson et al. |
| 2003/0154239 | A1 | 8/2003 | Davis et al. |
| 2003/0167320 | A1 | 9/2003 | Perez |
| 2003/0187946 | A1 | 10/2003 | Cable |
| 2003/0208593 | A1 | 11/2003 | Bharati et al. |
| 2003/0225851 | A1 | 12/2003 | Fanshier et al. |
| 2004/0205206 | A1 * | 10/2004 | Naik et al. .................... 709/230 |
| 2004/0230795 | A1 | 11/2004 | Armitano et al. |
| 2005/0021316 | A1 | 1/2005 | Bollobas et al. |
| 2005/0086640 | A1 | 4/2005 | Kolehmainen et al. |
| 2005/0108731 | A1 | 5/2005 | Corell et al. |
| 2005/0160104 | A1 | 7/2005 | Meera et al. |
| 2005/0198647 | A1 * | 9/2005 | Hipp et al. .................... 719/310 |
| 2006/0015849 | A1 | 1/2006 | Polozoff |
| 2006/0069665 | A1 | 3/2006 | Yamakawa et al. |
| 2006/0136908 | A1 * | 6/2006 | Gebhart et al. ............... 717/177 |
| 2006/0168567 | A1 | 7/2006 | Kressin et al. |
| 2007/0058631 | A1 | 3/2007 | Mortier et al. |

FOREIGN PATENT DOCUMENTS

| | | |
|---|---|---|
| JP | 2006502457A A | 1/2006 |
| WO | 9504968 A1 | 2/1995 |
| WO | 2006005655 A1 | 1/2006 |

OTHER PUBLICATIONS

Bela Bollobas et al., "Robustness and Vulnerability of Scale-Free Random Graphs", Internet Mathematics vol. 1, No. 1, dated 2002, pp. 1-35.

Alina Beygelzimer et al, "Improving Network Robustness by Edge Modification", IBM TJ Watson Research Center, dated Mar. 30, 2005.

Sheresh et al, "Distributed File System", Found at:Server Administrators Bible:Option Pack Edition, pulled from www.windowsitlibrary.com/content/405/25/1.html, dated 1999.

Grabarnik, U.S. Appl. No. 11/358,304, Office Action Communication, Apr. 3, 2009, 11 pages.

Grabarnik, U.S. Appl. No. 11/358,304, Office Action Communication, Nov. 12, 2009, 11 pages.

Sheresh et al., "Microsoft Windows NT Server Administrator's Bible: Option Pack Edition", Distributed File System, 4 pages, Chapter 1, Apr. 1999, retrieved in Nov. 2006.

Ohkawa, "Provide a Facade Interface for Enterprise Web Services", Jan. 6, 2004, 14 pages.

Tatsubori et al., "A Bytecode Translator for Distributed Execution of Legacy Java Software", 2001, pp. 236-255, Lector Notes in Computer Science, Springer Verlag, Berlin, DE, vol. 2072.

Machado et al., "Enable Existing Applications for Grid", pp. 1-14, Jun. 22, 2004, URL: http://www.ibm.com/developerworks/grid/library/gr-exist/.

Doganata et al., U.S. Appl. No. 11/365,373, filed Mar. 1, 2006, Office Action Summary, Aug. 19, 2009, 30 pages.

Durham, U.S. Appl. No. 10/718,419, filed Nov. 20, 2003, Office Action Summary, Nov. 14, 2005, 27 pages.

Durham, U.S. Appl. No. 10/718,419, filed Nov. 20, 2003, Office Action Summary, Apr. 6, 2006, 33 pages.

Durham, U.S. Appl. No. 10/718,419, filed Nov. 20, 2003, Office Action Summary, Aug. 9, 2006, 29 pages.

Durham, U.S. Appl. No. 10/718,419, filed Nov. 20, 2003, Notice of Allowance and Fee(s) Due, Feb. 21, 2007, 7 pages.

Doganata et al., U.S. Appl. No. 11/365,373, filed Mar. 1, 2006, Office Action Communication dated Jan. 22, 2010, 22 pages.

Patel, Final Office Action Communication for U.S. Appl. No. 11/365,373 dated Apr. 25, 2011, 15 pages.

Patel, Notice of Allowance and Fee(s) Due for U.S. Appl. No. 11/365,373 dated Oct. 6, 2011, 24 pages.

Sheresh et al., "Microsoft Windows NT Server Administrator's Bible: Option Pack Edition," retrieved from http://www.windowsitlibrary.com/documents/book.cfm?documentID=405 on Nov. 2, 2005, 7 pages.

Grabarnik et al., U.S. Appl. No. 11/358,304, filed Feb. 21, 2006, Notice of Allowance and Fee(s) Due dated Jun. 29, 2010, 38 pages.

Doganata et al., U.S. Appl. No. 11/365,373, filed Mar. 1, 2006, Office Communication dated Aug. 5, 2010, 20 pages.

Hiren P. Patel, "Final Office Action", U.S. Appl. No. 11/365,373, Notification Date Nov. 26, 2010, 19 pages.

Nguyen, Notice of Allowance and Fee(s) Due dated Sep. 24, 2010 for U.S. Appl. No. 11/358,304, 8 pages.

* cited by examiner

METHOD, SYSTEM AND PROGRAM PRODUCT FOR MANAGING APPLICATIONS IN A SHARED COMPUTER INFRASTRUCTURE

CROSS-REFERENCE TO RELATED APPLICATIONS

This Application is related in some aspects to co-pending U.S. application No. 10/718,419, entitled "COMPUTERIZED SYSTEM, METHOD AND PROGRAM PRODUCT FOR MANAGING AN ENTERPRISE STORAGE SYSTEM" filed Nov. 20, 2003 and herein incorporated by reference.

FIELD OF THE INVENTION

In general, the present invention relates to application decoupling. Specifically, the present invention relates to a method, system and program product for managing applications in a shared computer infrastructure.

BACKGROUND OF THE INVENTION

Today's common web service architecture provides multiple services within a single infrastructure. Enterprises with common needs are also coming together to share infrastructure and business processes. An advantage of this approach is that each pays only a fraction of the entire cost involved. The above-incorporated patent application discloses a storage grid architecture that optimizes storage utilization by "gridifying" storage cells within a common infrastructure. This type of structure not only provides redundancy, but also takes performance-based parameters such as storage capacity, user requirements, etc., into consideration when selecting a file sharing location.

One issue that arises with shared infrastructures involves the tracking and management of applications. Specifically, it is highly common for a shared infrastructure to implement multiple different applications, which might even use the same data. However, when doing so, they commonly become "coupled." That is, the individual applications are not easily tracked or managed.

Given the relative recentness in which shared infrastructures have become common, no existing solution addresses this issue. In view of the foregoing, there exists a need for a method, system and program product for managing applications in a shared computer infrastructure. Specifically, a need exists for a system that decouples applications in the shared computer infrastructure so that they can be tracked and managed individually.

SUMMARY OF THE INVENTION

In general, the present invention provides a method, system and program product for managing and/or decoupling applications in a shared computer infrastructure. Specifically, under the present invention, when an application is deployed, certain information corresponding thereto will be stored in an Enterprise Application Directory (EAD). Thereafter, when an instance of the application is requested (e.g., by a requestor), the information is retrieved from the EAD. In addition, the instance is registered with an Application Access Registry (AAR). Registering the instance involves creating a record in the AAR, generating a unique application access key for the instance, and storing the access key with the information in the record. The access key (and optionally the information) is then returned to the requestor, which can then issue service requests to one or more grid services in the shared computer infrastructure. The service request will include the access key so that the grid service can identify the application by searching for the record in the registry using the access key.

A first aspect of the present invention provides a method for managing applications in a shared computer infrastructure, comprising: receiving a request for an instance of an application in the shared infrastructure from a requestor; receiving information corresponding to the application from a directory; registering the instance with a registry; receiving an access key for the instance from the registry after the registering; and returning the access key to the requestor.

A second aspect of the present invention provides a system for managing applications in a shared computer infrastructure, comprising: a system for receiving a request for an instance of an application in the shared infrastructure from a requestor; a system for obtaining information corresponding to the application from a directory; a system for receiving an access key for the instance from a registry in which the instance is registered; and a system for returning the access key to the requestor.

A third aspect of the present invention provides a program product stored on a computer readable medium for managing applications in a shared computer infrastructure, the computer readable medium comprising program code for performing the following steps: receiving a request for an instance of an application in the shared infrastructure from a requestor; obtaining information corresponding to the application from a directory; receiving an access key for the instance from a registry in which the instance is registered; and returning the access key to the requestor.

A fourth aspect of the present invention provides a method for deploying an application for managing applications in a shared computer infrastructure, comprising: providing a computer system being operable to: receive a request for an instance of an application in the shared infrastructure from a requestor; obtain information corresponding to the application from a directory; receive an access key for the instance from a registry in which the instance is registered; and return the access key to the requestor.

A fifth aspect of the present invention provides computer software embodied in a propagated signal for managing applications in a shared computer infrastructure, the computer software comprising instructions to cause a computer system to perform the following: receive a request for an instance of an application in the shared infrastructure from a requestor; obtain information corresponding to the application from a directory; receive an access key for the instance from a registry in which the instance is registered; and return the access key to the requestor.

A sixth aspect of the present invention provides a method for identifying applications in a shared computer infrastructure, comprising: receiving a request for an instance of an application in the shared infrastructure; receiving information corresponding to the application from a directory; registering the instance with a registry; receiving an access key for the instance from the registry after the registering; and identifying the application by searching for the record in the registry using the access key.

Therefore, the present invention provides a method, system and program product for managing and/or decoupling applications in a shared computer infrastructure.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

As indicated above, the present invention provides a method, system and program product for managing and/or decoupling applications in a shared computer infrastructure. Specifically, under the present invention, when an application is deployed, certain information corresponding thereto will be stored in an Enterprise Application Directory (EAD). Thereafter, when an instance of the application is requested (e.g., by a requestor), the information is retrieved from the EAD. In addition, the instance is registered with an Application Access Registry (AAR). Registering the instance involves creating a record in the AAR, generating a unique application access key for the instance, and storing the access key with the information in the record. The access key (and optionally the information) is then returned to the requestor, which can then issue service requests to one or more grid services in the shared computer infrastructure. The service request will include the access key so that the grid service can identify the application by searching for the record in the registry using the access key.

Figure 1:
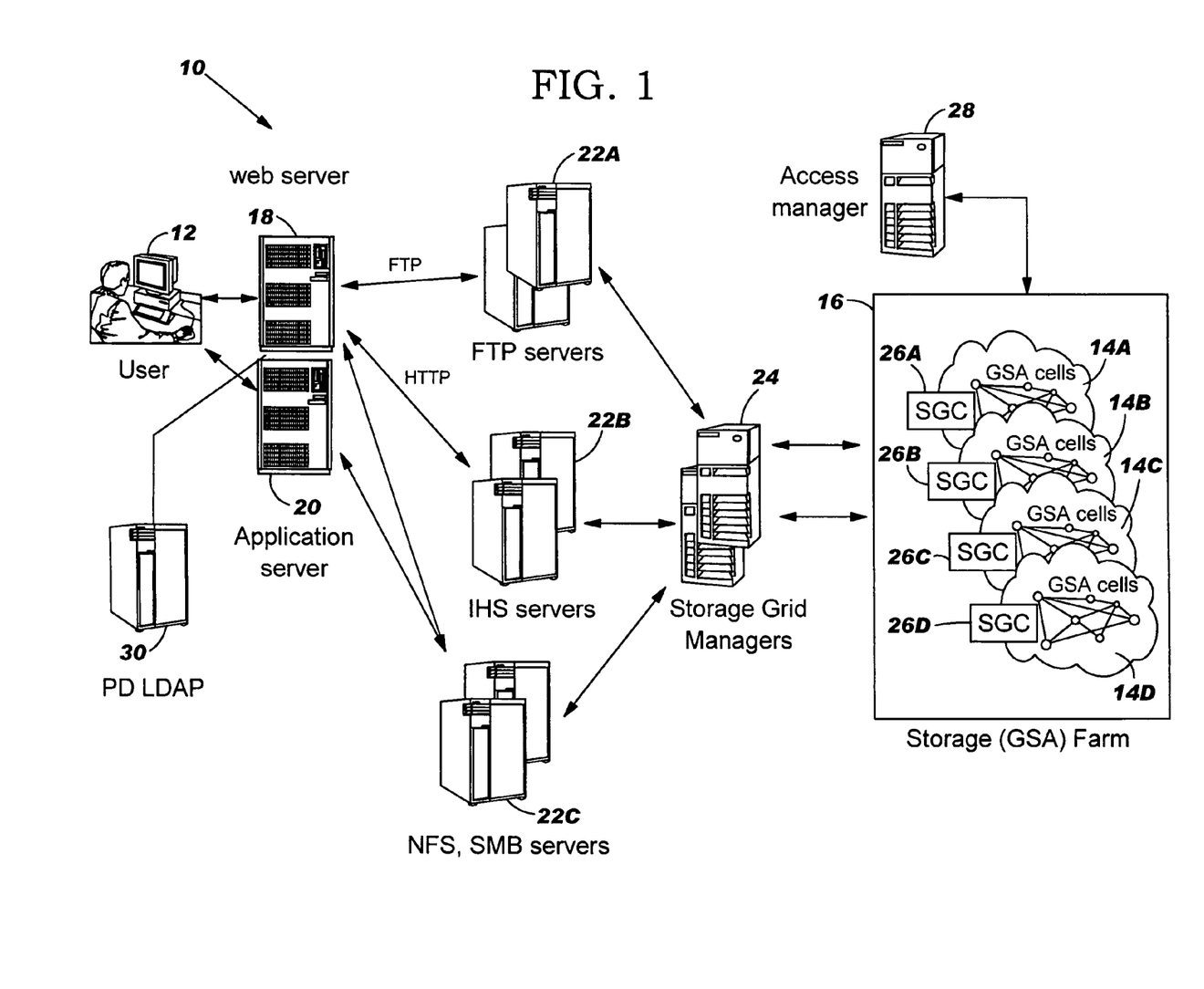
FIG. 1 depicts a Storage Grid Architecture (SGA) in accordance with the related art.

Referring now to FIG. 1, a storage grid architectural (SGA) diagram 10 according to the above-incorporated patent application is shown. In general, SGA 10 allows users such as user 12 to store files and the like in one or more storage cells/farms 14A-D of enterprise storage system 16. To this extent, SGA 10 is typically implemented over a network such as the Internet, a local area network (LAN), a wide area network (WAN), a virtual private network (VPN), etc. As such, communication between the various components shown in FIG. 1 could occur in a client-server or server-server environment via a direct hardwired connection (e.g., serial port), or via an addressable connection that may utilize any combination of wireline and/or wireless transmission methods. The components may utilize conventional network connectivity, such as Token Ring, Ethernet, WiFi or other conventional communications standards. Moreover, connectivity could be provided by conventional TCP/IP sockets-based protocol. In this instance, the components could utilize an Internet service provider to establish connectivity. It should be appreciated that the architecture shown in FIG. 1 is intended to be illustrative only and that other variations could be implemented within the scope of the present invention. For example, any quantity of storage cells 14A-D and/or storage grid managers 24 could be provided.

Regardless, in a typical embodiment, user 12 will store a file by generating a request via an application on his/her computer system (e.g., a personal computer, a workstation, a laptop, a hand-held device, etc.). Depending on the desired communication protocol, the request will be transmitted to web server 18 and/or application server 20, and from there to a respective "protocol" server 22A-C. For example, if user 12 desired to use File Transfer Protocol (FTP) to request storage of the file, the request would be routed to web server 18 and then to FTP server 22A. As such, the present invention can accommodate any type of protocol user 12 might wish to utilize. For example, storage can be provided for Hypertext Transfer Protocol (HTTP), Common Internet File System (CIFS), Network File System (NFS), Server Message Block Protocol (SMB), etc.

Once the request is received by a protocol server 22A-C, it will be routed to storage grid manager 24 (e.g., to one a possible group of storage grid managers). As will be further described below, storage grid manager 24 is configured to determine the most optimal or appropriate storage cell 14A-D for storing the file. In general, this determination is made under the present invention based on certain predetermined performance parameters. For example, the determination can be made based upon a user identity, a storage cost, a specific user requirement, a desired cell usage pattern/balance, a security requirement, a storage cell availability, a redundancy requirement and a network optimization requirement. Thus, if a file required access by a group of users, it could be stored in a storage cell 14A-D that is most central to all such users, not just the user requesting the storage. Moreover, if a certain storage cell 14A-D was nearing capacity, the file might be stored in another (albeit more distant) storage cell 14A-D so that the load of storage cells 14A-D could be kept balanced.

In any event, once the appropriate storage cell 14A-D is identified, storage grid manager 24 will route the request to the storage grid controller 26A-D corresponding thereto. Specifically, each storage cell 14A-D is associated with one storage grid controller 26A-D. This relationship allows each storage grid controller 14A-D to serve at least two primary functions. Namely, to provide resource information about storage cells 14A-D to storage grid manager 24, and to act as a "gatekeeper" of its respective storage cell 14A-D. In the case of the former, under the present invention, storage grid manager 24 will receive information regarding capacity of the storage cells 14A-D. This information can be communicated upon request by storage grid manager 24, or updates can be periodically sent from each storage cell 14A-D via storage grid controllers 26A-D. In either event, the resource information is used by storage grid manager 24 in determining which storage cell 14 is the most appropriate for storing the file. For example, as indicated above, if storage cell 14A is closest geographically to user 12, but is close to capacity, storage grid manager 24 might route the request to storage cell 14B.

Assuming storage cell 14B was identified as the most appropriate storage location for the file, storage grid manager 24 will route the request to store the file to storage grid cell 14B via storage grid controller 26B. In so doing, storage grid manager 24 will likely add additional information such as identification and/or authorization/authentication information for user 12. Moreover, the request will typically be routed from storage grid manager 24 using the same protocol in which it was received by storage grid manager 24, or via a private protocol.

Upon receipt of the request, the storage grid controller 26B will consult access manager 28, which will access PD Lightweight Directory Access Protocol (LDAP) directory 30 to determine if user 12 is authorized to access storage cell 14B (i.e., enforce access control specifications for storage cells 14A-D). In a typical embodiment, LDAP directory 30 is a DB2 database that stores permissions in an additive hierarchy.

Specifically, after a user is given permission to a path, the user has that same permission to all sub-paths under it. The user cannot be added with the same permission to any of the sub-paths. Ones and zeros represent permissions in the database. A one indicates that the user has a particular permission to a resource and a zero is a place holder. A zero does not indicate a negative permission. Rather, it merely says that a particular permission was not granted at that level of the hierarchy to a particular user. Moreover, there can be a situation where a user has a record granting access at a certain level and a level below that. This situation can occur when access to the higher level was granted after access to the lower level had been granted.

Assuming that user 12 was authorized to access storage cell 14B, the file will be stored therein and storage grid manager 24 will update a mapping that correlates files with the storage cells in which they are stored. Specifically, among its other functions, storage grid manager 24 maintains a mapping that it updates as files are stored in storage cells 14A-D. Thus, if user 12 later issues a request to retrieve the file, the request will be routed to storage grid manager 24, which will consult the mapping to identify the appropriate storage cell 14B. Upon so doing, storage grid manager 24 will route the request to storage cell 14B and/or storage grid controller 26B, which will again perform access control via access manager 28 and LDAP 30. Assuming user 12 is still authorized to access storage cell 14B, the file will be retrieved for access by user 12.

Figure 2:
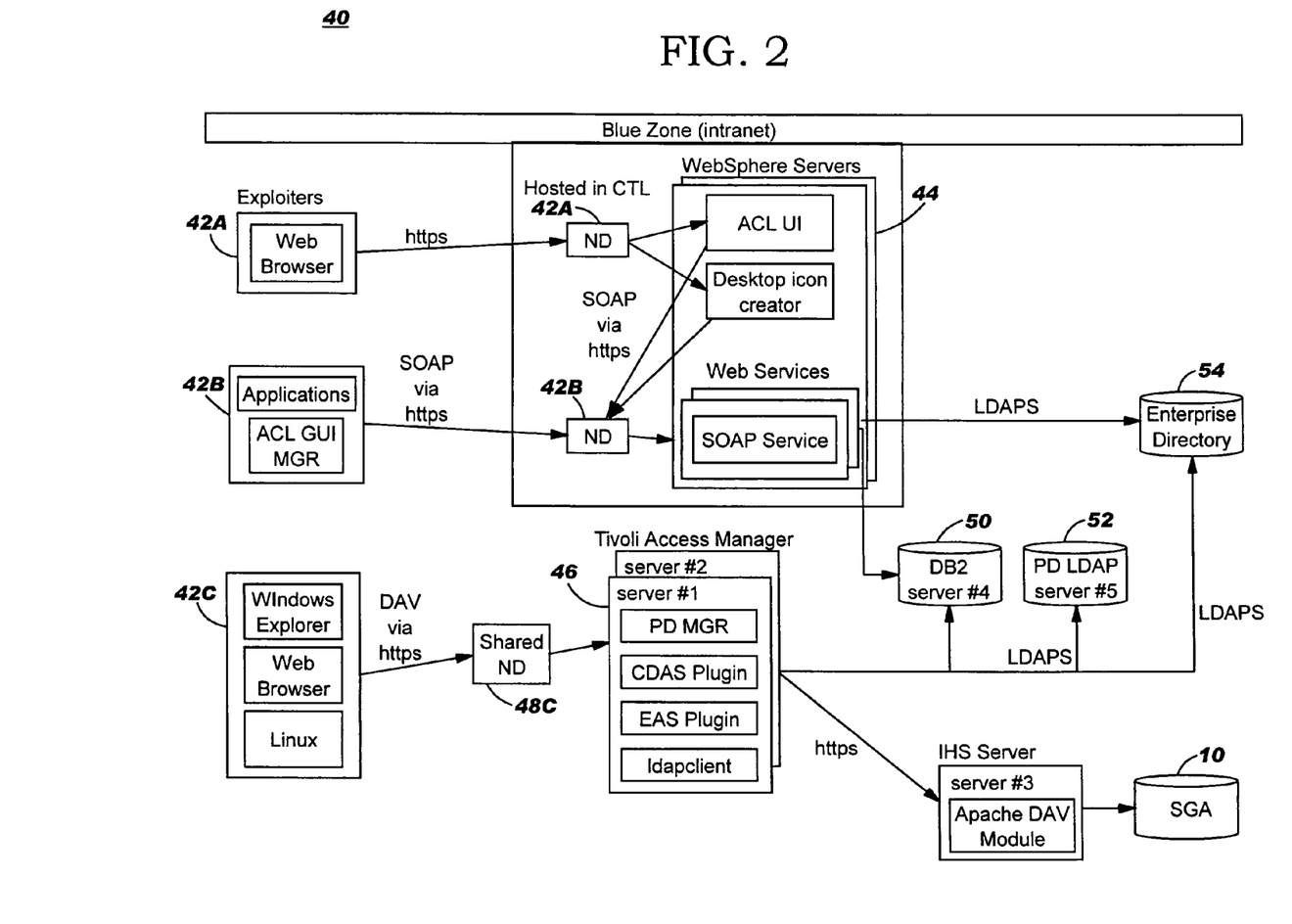
FIG. 2 depicts a shared computer infrastructure in accordance with the related art.

Due to its inherent usefulness, SGA 10 can be implemented in a shared computer infrastructure 40 such as that shown in FIG. 2. As shown, various exploiters 42A-C can communicate using assorted protocols with hosted servers 44 and/or managed servers 46 (e.g., via network dispatchers 48A-C). In turn, hosted servers 44 and managed servers 46 can implement services and access various resources such as database 50, Lightweight Directory Access Protocol (LDAP) directory 52, enterprise directory 54 and SGA 10. Unfortunately, as mentioned above, shared infrastructure 40 will typically contain multiple different applications that cannot be (or cannot easily be) tracked and/or managed on an individual basis. That is, when deploying multiple applications in a shared infrastructure, the applications become "coupled" to one another.

Figure 3:
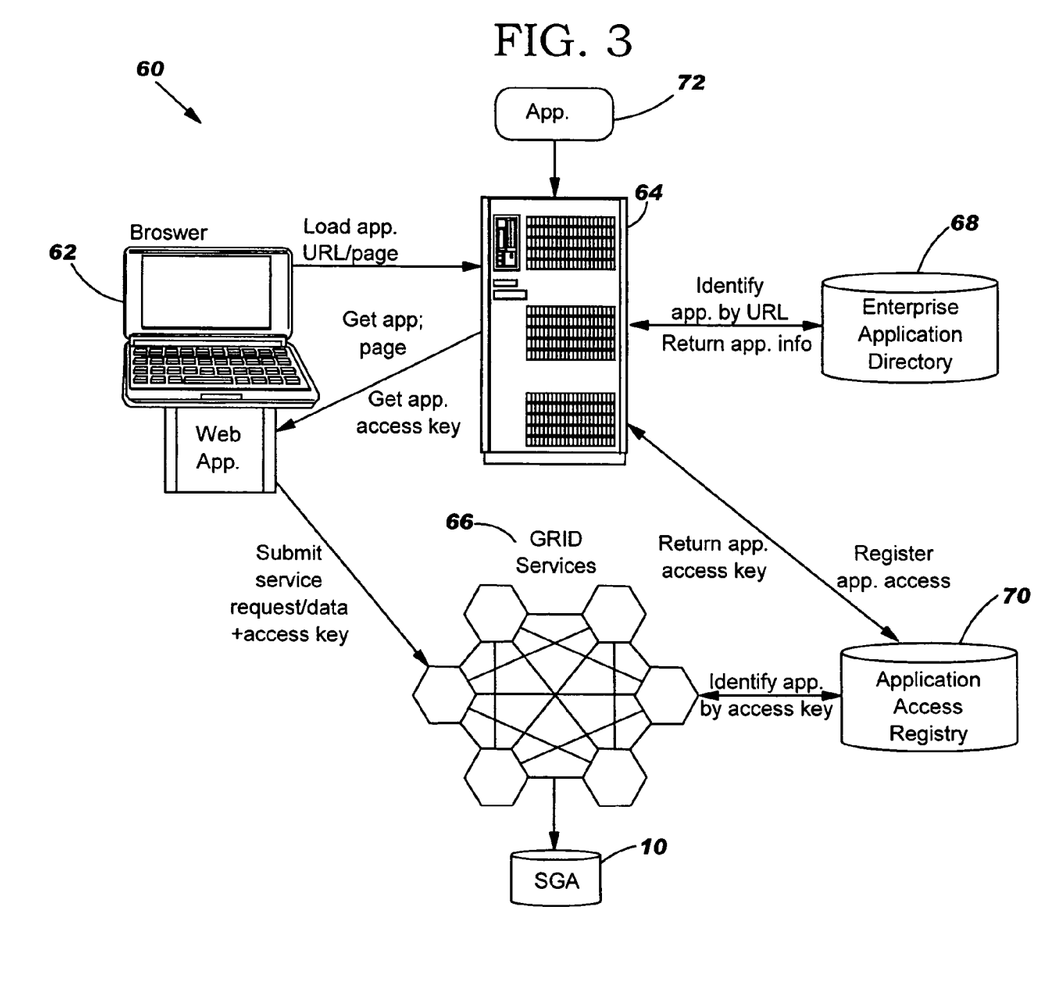
FIG. 3 depicts a shared computer infrastructure in accordance with the present invention.

Referring now to FIG. 3, a shared infrastructure 60 according to the present invention is depicted. As will be explained, shared infrastructure 60 is designed such that multiple applications are "decoupled." That is, any applications that are deployed within shared infrastructure 60 can be individually tracked and managed. In should be understood in advance that shared infrastructure 60 can include other components that are not shown, but are generally known. For example, shared infrastructure 60 can include any of the components shown in FIG. 2. Moreover, similar to SGD 10 of FIG. 1, shared infrastructure 60 is typically implemented over a network such as the Internet, a local area network (LAN), a wide area network (WAN), a virtual private network (VPN), etc. As such, communication between the various components shown in FIG. 3 could occur in a client-server or server-server environment via a direct hardwired connection (e.g., serial port), or via an addressable connection that may utilize any combination of wireline and/or wireless transmission methods. The components may utilize conventional network connectivity, such as Token Ring, Ethernet, WiFi or other conventional communications standards. Moreover, connectivity could be provided by conventional TCP/IP sockets-based protocol. In this instance, the components could utilize an Internet service provider to establish connectivity.

In any event, under the present invention, when an application 72 is initially deployed within shared infrastructure, certain corresponding information will be stored in Enterprise Application Directory (EAD) 68. Such information could include, for example, application Uniform Resource Locators (URLs), a category of application 72, a description of application 72, setting of application 72, etc. In a typical embodiment, EAD 68 can be similar to the application registry database shown and described in U.S. Pat. No. 6,341, 314, which is commonly assigned with the present application and herein incorporated by reference.

Once application 72 has been deployed and its corresponding information has been stored in EAD 68, a requestor 62 (e.g., a client) can request instances thereof. For an illustrative example, assume that requestor 62 has requested an instance of application 72 using a browser or the like. In a typical embodiment, the request will include a URL corresponding to application 72. The request would be received by server 64, which will retrieve the corresponding information for application 72 from EAD 68 using the URL. In addition, the instance of application 72 would be registered with Application Access Registry (AAR) 70. In registering the instance, the following events would occur: a record for the instance would be created in AAR 70, an application access key (hereinafter "access key") would be generated, and the access key and the information retrieved from EAD 68 would be stored in the record. In a typical embodiment, the access key is a unique value (e.g., a number) that only corresponds to the particular instance that was requested.

Thereafter, the access key is returned to server 64 and then to requestor 62 along with the requested instance (e.g., an application page). If requestor 62 later issues a service request to a grid service 66 or the like, the request will include (or be accompanied by) the access key. This enables the grid service 66 to identify application 72 (and the instance) by searching for its previously created record in AAR 70 using the access key. As also shown in FIG. 3, grid services 66 can communicate with an SGA 10 such as that shown in FIG. 1 to store and/or retrieve data for associated services.

Figure 4:
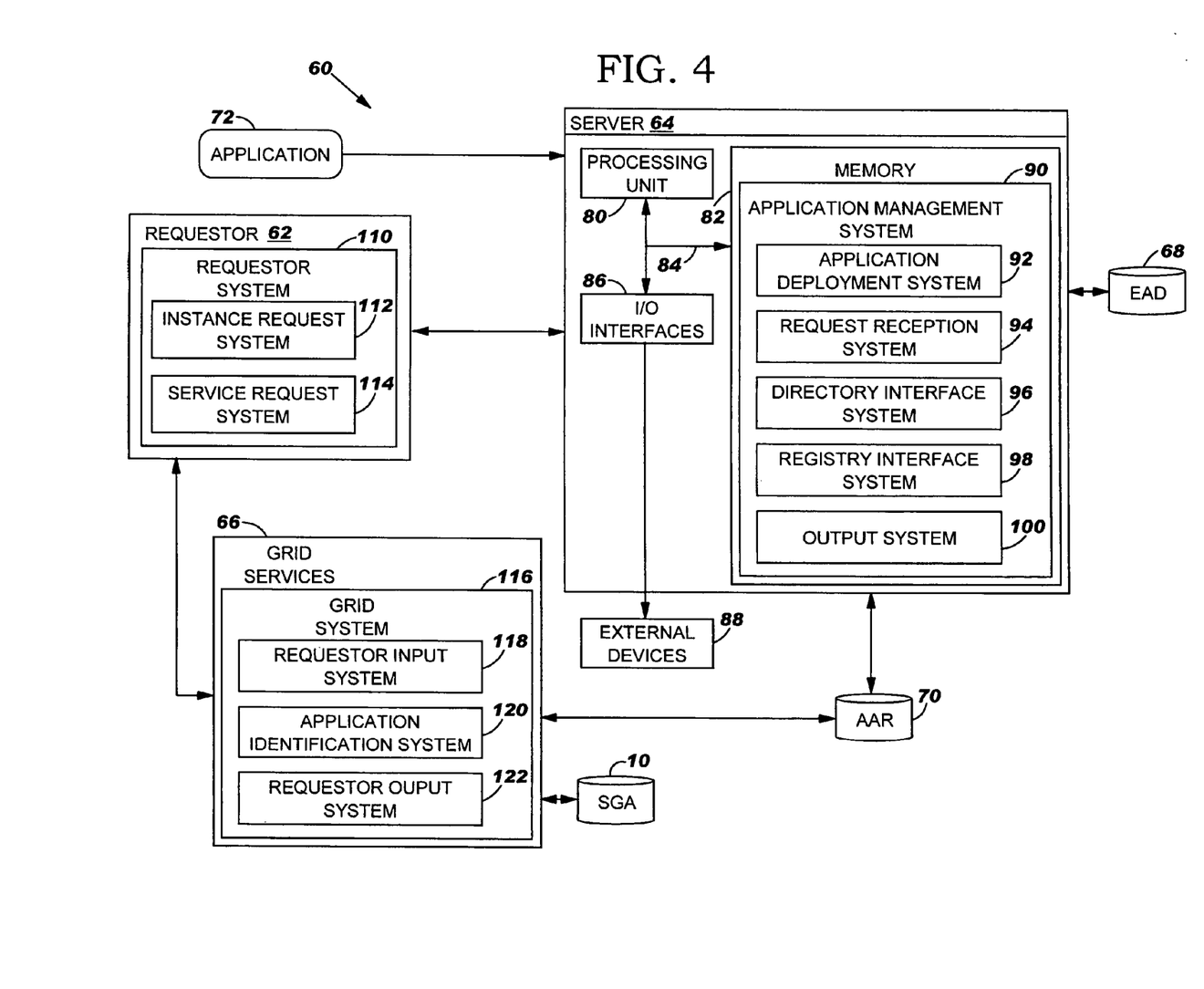
FIG. 4 depicts a more detailed diagram of the shared computer infrastructure of FIG. 3.

Referring now to FIG. 4, a more detailed diagram of shared infrastructure 60 is shown. As depicted, server 64 generally includes processing unit 80, memory 82, bus 84, input/output (I/O) interfaces 86, and external devices/resources 88. Processing unit 80 may comprise a single processing unit, or be distributed across one or more processing units in one or more locations, e.g., on a client and server. Memory 82 may comprise any known type of data storage and/or transmission media, including magnetic media, optical media, random access memory (RAM), read-only memory (ROM), a data cache, a data object, etc. Moreover, similar to processing unit 80, memory 82 may reside at a single physical location, comprising one or more types of data storage, or be distributed across a plurality of physical systems in various forms.

I/O interfaces 86 may comprise any system for exchanging information to/from an external source. External devices/resources 88 may comprise any known type of external device, including speakers, a CRT, LED screen, hand-held device, keyboard, mouse, voice recognition system, speech output system, printer, monitor/display, facsimile, pager, etc. Bus 84 provides a communication link between each of the components in server 64 and likewise may comprise any known type of transmission link, including electrical, optical, wireless, etc.

As mentioned above, EAD 68 can be similar to the application registry database disclosed in Pat. No. 6,341,314. However, EAD 68 and/or AAR 70 can be any type of systems (e.g., databases) capable of providing storage for data (e.g., application information, access keys, etc.) under the present invention. As such, EAD 68 and/or AAR 70 could include one or more storage devices, such as a magnetic disk drive or an optical disk drive. In another embodiment, EAD 68 and/or AAR 70 include data distributed across, for example, a local area network (LAN), wide area network (WAN) or a storage area network (SAN) (not shown). Although not shown, additional components, such as cache memory, communication systems, system software, etc., may be incorporated into server 64. It should be understood that requestor 62 and/or grid services 66 will include computerized components similar to server 64. Such components have not been shown for brevity purposes.

Shown loaded on server 64 is application management system 90, which includes application deployment system 92, request reception system 94, directory interface system 96, registry interface system 98 and output system 100. Shown loaded on requestor 62 is requestor system 110, which includes instance request system 112 and service request system 114. Moreover, shown loaded on grid services 66 is grid system 116, which includes requestor input system 118, application identification system 120, and requestor output system 122. It should be understood that other systems (e.g., browsers, server software, platforms, etc.) will also be loaded on requestor 62, server 64 and grid services 66. Such systems have not been shown for brevity purposes. It should also be understood that requestor 62, server 64 and grid services 66 can comprise any type of computerized systems capable of carrying out the functions of the present invention. For example, requestor 62, server 64 and grid services 66 could comprise one or more laptop computers, desktop computers, workstations, handheld devices, etc.

When application 72 is initially deployed in shared infrastructure 60, application deployment system 92 will store its corresponding information in EAD 68. Thereafter, when requestor 62 later requests an instance of application 72, requestor 62 will issue a request using instance request system 112. As mentioned above, the request can include a URL of the application 72. The request will be received by request reception system 94 of server 64. Directory interface system 96 will then use the URL to retrieve the information corresponding to application 72 from EAD 68. Registry interface system 98 will then interface with AAR 70 to register the requested instance of application 72. In registering the instance, a record will be created for the instance in AAR 70, an access key (e.g., unique number) will be generated for the instance and the information and the access key will be stored in the newly created record. This "registration" functionality can be provided by registry interface system 98. Alternatively, some or all of these registration functions (e.g., generating the access key) could be performed outside of server 64 by AAR 70 (e.g., by a separate computer system controlling AAR 70). Regardless, the access key will be received by server 64, and then returned along with the instance (e.g., an application page) by output system 100 to requestor 62.

The instance and the access key will be received by instance request system 112. Thereafter, assume that requestor 62 wishes to issue a service request to a grid service 66. In this case, service request system 114 will issue a service request to grid service 66. However, under the present invention, the service request will include the access key for the instance of application 72. The service request will be received by requestor input system 118. Thereafter, application identification system 120 will identify application 72 by searching for its record in AAR 70 using the access key. Once identified, an output or requested data (e.g., as obtained from SGA 10) can be returned to requestor 62 by requestor output system 122.

Thus, by storing corresponding information upon deployment of application, registering each instance requested, and utilizing an access key, the present invention allows multiple applications to be deployed on shared infrastructure in such a way that they can be individually tracked and managed.

It should be appreciated that the present invention could be offered as a business method on a subscription or fee basis. For example, shared infrastructure 60, server 64 or any of the components/systems thereof could be created, supported, maintained and/or deployed by a service provider that offers the functions described herein for customers. That is, a service provider could offer to individually track and manage multiple applications deployed in a shared infrastructure for clients.

It should also be understood that the present invention could be realized in hardware, software, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, application management system 90, requestor system 110 and grid system 116 are shown with a certain configuration of sub-systems for illustrative purposes only.

We claim:

1. A computer implemented method for managing applications in a shared computer infrastructure, comprising:

accessing a storage grid architecture for a plurality of commonly shared user files, wherein the storage grid architecture includes a grid service for managing a service request;

receiving a request for an instance of a plurality of instances of an application in the shared infrastructure from a requestor, the application being configured to access data in the shared infrastructure, where the request includes a Uniform Resource Locator;

receiving information corresponding to the application from an Enterprise Application Directory based on the Uniform Resource Locator, the information including information that identifies the application as a whole to enable execution of the application;

registering the instance of the application with a registry by creating a record and generating an access key within the registry as part of the registering process, the access key being a unique value that only corresponds to the instance and the requestor that requested the instance; and returning the access key to the requestor along with the application instance, the application instance being a unique instance temporarily provided for execution by a computer device of the requestor and being adapted to be provided at a same time as a second instance of the same application to a second requestor, wherein the access key included in a service request allows the grid service to search the registry for the record containing the application corresponding to the access key and allows the application to be decoupled from another application that uses common data with the application, the shared infrastructure including a storage grid architecture having the common data stored therein.

2. The method of claim 1, wherein the registering step further comprises storing the access key and the information in the record.

3. The method of claim 1, further comprising:

submitting the service request from the requestor to the grid service, wherein the service request includes the access key; and the grid service identifying the application by searching for the record in the registry using the access key.

4. The method of claim 1, further comprising storing the information in the directory upon deployment of the application in the shared infrastructure.

5. The method of claim 1, wherein the information further comprises a description of the application and settings for the application.

6. The method of claim 1, wherein the access key comprises a unique value corresponding to the instance.

7. The method of claim 1, wherein the application is one of a plurality of applications in the shared infrastructure.

8. A system for managing applications in a shared computer infrastructure, comprising at least one computer device that performs a method, comprising:

accessing a storage grid architecture for a plurality of commonly shared user files, wherein the storage grid architecture includes a grid service for managing a service request;

receiving a request for an instance of a plurality of instances of an application in the shared infrastructure from a requestor, the application being configured to access data in the shared infrastructure, where the request includes a Uniform Resource Locator;

obtaining information corresponding to the application from an Enterprise, Application Directory based on the Uniform Resource Locator, the information including information that identifies the application as a whole to enable execution of the application;

registering the instance of the application with a registry by creating a record and generating an access key within the registry as part of the registering process, the access key being a unique value that only corresponds to the instance and the requestor that requested the instance; and returning the access key to the requestor along with the application instance, the application instance being a unique instance temporarily provided for execution by a computer device of the requestor and being adapted to be provided at a same time as a second instance of the same application to a second requestor, wherein the access key included in a service request allows the grid service to search the registry for the record containing the application corresponding to the access key and allows the application to be decoupled from another application that uses common data with the application, the shared infrastructure including a storage grid architecture having the common data stored therein.

9. The system of claim 8, wherein the registering further stores the access key with the information in the record.

10. The system of claim 8, wherein the requestor comprises:

a system for requesting the instance from the shared infrastructure;

a system for receiving the information and the access key from the shared infrastructure; and a system for submitting a service request that includes the access key to the grid service.

11. The system of claim 10, wherein the grid service comprises a system for searching for the record using the access key received from the requestor.

12. The system of claim 8, further comprising a system for storing the information in the directory upon deployment of the application.

13. The system of claim 8, wherein the information further comprises a description of the application and settings for the application.

14. The system of claim 8, wherein the access key comprises a unique value corresponding to the instance.

15. A program product stored on a non-transitory computer readable storage device for managing applications in a shared computer infrastructure, that performs the following steps:

accessing a storage grid architecture for a plurality of commonly shared user files, wherein the storage grid architecture includes a grid service for managing a service request;

receiving a request for an instance of a plurality of instances of an application in the shared infrastructure from a requestor, the application being configured to access data in the shared infrastructure, where the request includes a Uniform Resource Locator;

obtaining information corresponding to the application from an Enterprise Application Directory based on the Uniform Resource Locator, the information including information that identifies the application as a whole to enable execution of the application;

registering the instance of the application with a registry by creating a record and generating an access key within the registry as part of the registering process, the access key being a unique value that only corresponds to the instance and the requestor that requested the instance; and returning the access key to the requestor along with the application instance, the application instance being a unique instance temporarily provided for execution by a computer device of the requestor and being adapted to be provided at a same time as a second instance of the same application to a second requestor, wherein the access key included in a service request allows the grid service to search the registry for the record containing the application corresponding to the access key and allows the application to be decoupled from another application that uses common data with the application, the shared infrastructure including a storage grid architecture having the common data stored therein.

16. The program product of claim 15, wherein computer readable device further comprises program code for storing the access key with the information in the record.

17. The program product of claim 15, wherein computer readable device further comprises program code for performing the following step:
  storing the information in the directory upon deployment of the application.

18. The program product of claim 15, wherein the information further comprises a description of the application and settings for the application.

19. The program product of claim 15, wherein the access key comprises a unique value corresponding to the instance.

20. A method for deploying an application for managing applications in a shared computer infrastructure, comprising:
  providing a computer system being operable to:
    access a storage grid architecture for a plurality of commonly shared user files,
  wherein the storage grid architecture includes a grid service for managing a service request;
    receive a request for an instance of a plurality of instances of an application in the shared infrastructure from a requestor, the application being configured to access data in the shared infrastructure, where the request includes a Uniform Resource Locator;
    obtain information corresponding to the application from an Enterprise Application Directory based on the Uniform Resource Locator, the information including information that identifies the application as a whole to enable execution of the application;
    register the instance of the application with a registry by creating a record and generating an access key within the registry as part of the registering process, the access key being a unique value that only corresponds to the instance and the requestor that requested the instance; and
    return the access key to the requestor along with the application instance, the application instance being a unique instance temporarily provided for execution by a computer device of the requestor and being adapted to be provided at a same time as a second instance of the same application to a second requestor,
  wherein the access key included in a service request allows the grid service to search the registry for the record containing the application corresponding to the access key and allows the application to be decoupled from another application that uses common data with the application, the shared infrastructure including a storage grid architecture having the common data stored therein.

21. A computer implemented method for identifying applications in a shared computer infrastructure, comprising:
  accessing a storage grid architecture for a plurality of commonly shared user files, wherein the storage grid architecture includes a grid service for managing a service request;
  receiving a request for an instance of a plurality of instances of an application in the shared infrastructure, the application being configured to access data in the shared infrastructure, where the request includes a Uniform Resource Locator;
  receiving information corresponding to the application from an Enterprise Application Directory based on the Uniform Resource Locator, the information including information that identifies the application as a whole to enable execution of the application;
  registering the instance of the application with a registry by creating a record and generating an access key within the registry as part of the registering process, the access key being a unique value that only corresponds to the instance and the requestor that requested the instance;
  returning the access key to a requestor along with the application instance, the application instance being a unique instance temporarily provided for execution by a computer device of the requestor and being adapted to be provided at a same time as a second instance of the same application to a second requestor, and
  identifying the application by searching for the record in the registry using the access key in response to a service request to the shared computer resource by the requestor using the instance,
  wherein the access key included in the service request allows the grid service to search the registry for the record containing the application corresponding to the access key and allows the application to be decoupled from another application that uses common data with the application, the shared infrastructure including a storage grid architecture having the common data stored therein.

* * * * *